Nov. 24, 1964 F. G. NICKL 3,158,374

TRANSDUCER HEADS

Filed July 20, 1962 2 Sheets-Sheet 1

INVENTOR.
FRANKLYN G. NICKL

BY Robert Gottschalk

ATTY

Nov. 24, 1964 F. G. NICKL 3,158,374

TRANSDUCER HEADS

Filed July 20, 1962 2 Sheets-Sheet 2

*INVENTOR.*
FRANKLYN G. NICKL
BY Robert Gottschalk
ATTY

United States Patent Office 3,158,374
Patented Nov. 24, 1964

3,158,374
TRANSDUCER HEADS

Franklyn G. Nickl, Santa Barbara, Calif., assignor to Automatic Canteen Company of America, Chicago, Ill., a corporation of Delaware Filed July 20, 1962, Ser. No. 211,226
6 Claims. (Cl. 274—11)

This invention relates generally to a tape reproducing apparatus and more particularly to an improved transducer head assembly.

In tape apparatus of the magnetic or non-magnetic type, tape may be fed from a reel or tape magazine by means of a capstan drive wheel past a transducer head to either record or reproduce sound. It is particularly important in the reproduction of sound that the tape, as it moves past the transducer head, be properly aligned therewith. If the tape is not properly aligned, either the low or high frequency portions of the intelligence on the tape, or both, will not be properly reproduced. In modern tape systems, this general problem is somewhat more complicated due to the fact that the tape utilized may have four or more playing tracks thereon, with each track, for example, containing musical selections different from those of the other tracks.

It is, therefore, an object of this invention to provide a transducer head structure which may be properly and exactly aligned with the track portions of a tape.

Another object of this invention is to provide a transducer head assembly which may be easily and expeditiously adjusted so as to properly register the pick-up portions of the head with the playing tracks on a tape.

A further object of this invention is to provide a transducer head assembly which is of simple low-cost design and which may be properly aligned with the playing track on a tape with a minimum of special equipment.

A further object of this invention is to provide a new and improved means of adjusting playback heads which may be utilized with existing head structures.

Other objects and advantages of my invention will be apparent from the following description of the preferred embodiments of the invention taken in connection with the accompanying drawings in which.

Figures 1, 2, 3, 4, 5:
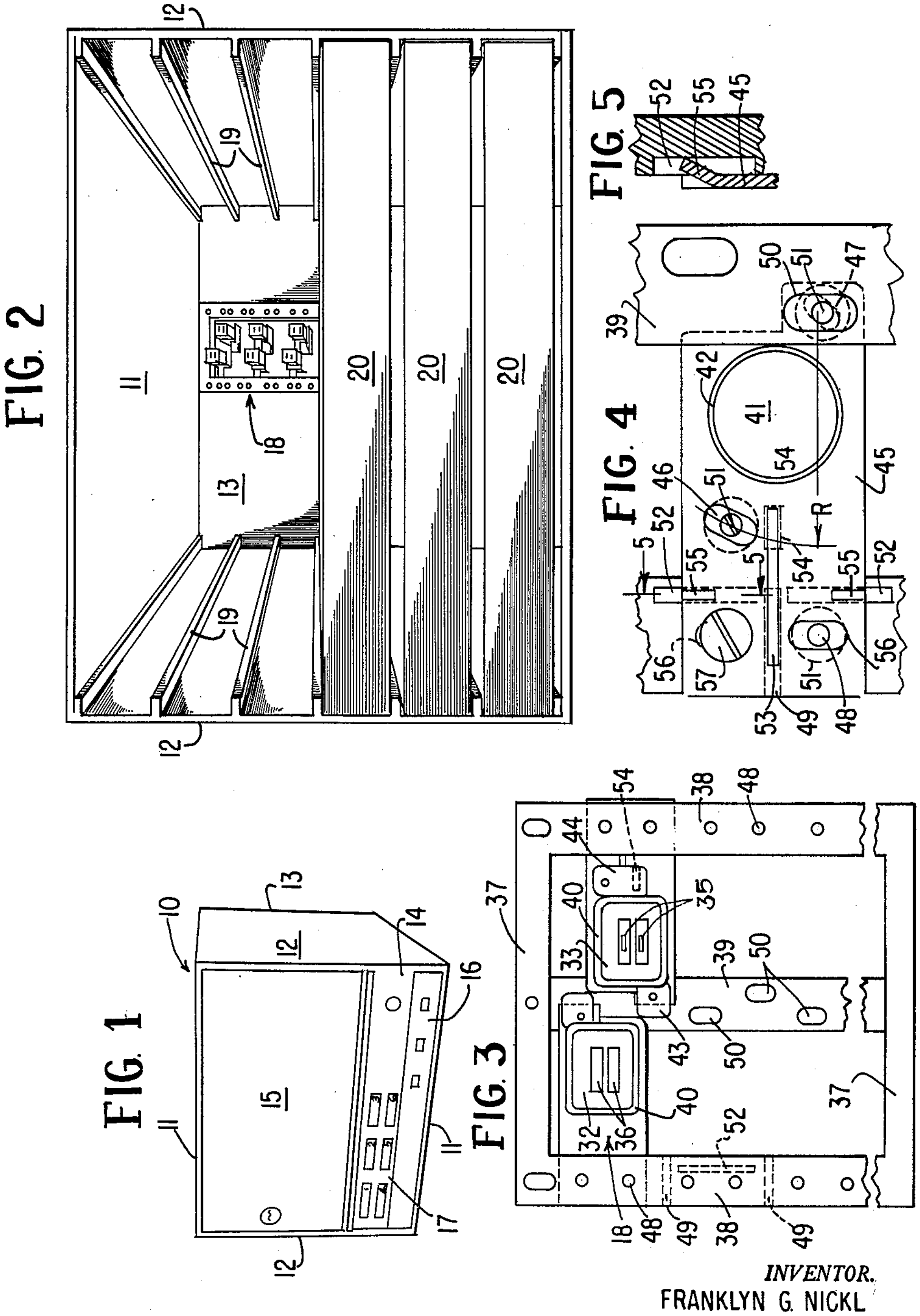
FIGURE 1 is a view in perspective of a tape cartridge unit.
FIGURE 2 is a partially cut away frontal elevation of the magazine housing of the unit of FIGURE 1.
FIGURE 3 is an enlarged elevation of a portion of the transducer section of the device.
FIGURE 4 is a view in rear elevation of a single transducer assembly.
FIGURE 5 is a view taken along the lines 5—5 of FIGURE 4.

Referring to FIGURE 1, 10 designates a tape cartridge unit generally, having top and bottom walls 11, opposed side walls 12, a rear wall 13, a frontal lower wall portion 14 and a hinged door portion 15. The frontal lower wall portion 14 is provided with controls 16 and with a plurality of indicators 17 which are equal in number to the magazines in the device and which serve to give a visible indication, via illumination for example, of which magazine is currently being played.

Referring now to FIGURE 2, which shows the door portion 15 removed, 18 indicates the transducer assembly which is mounted on the interior of the rear wall 13. Each of the side walls 12 has on the interior thereof a plurality of spaced apart parallel horizontally extending rails 19. A series of tape magazines 20, six in this case, although only three are shown, are positioned one above the other between adjacent rails.

Figure 6:
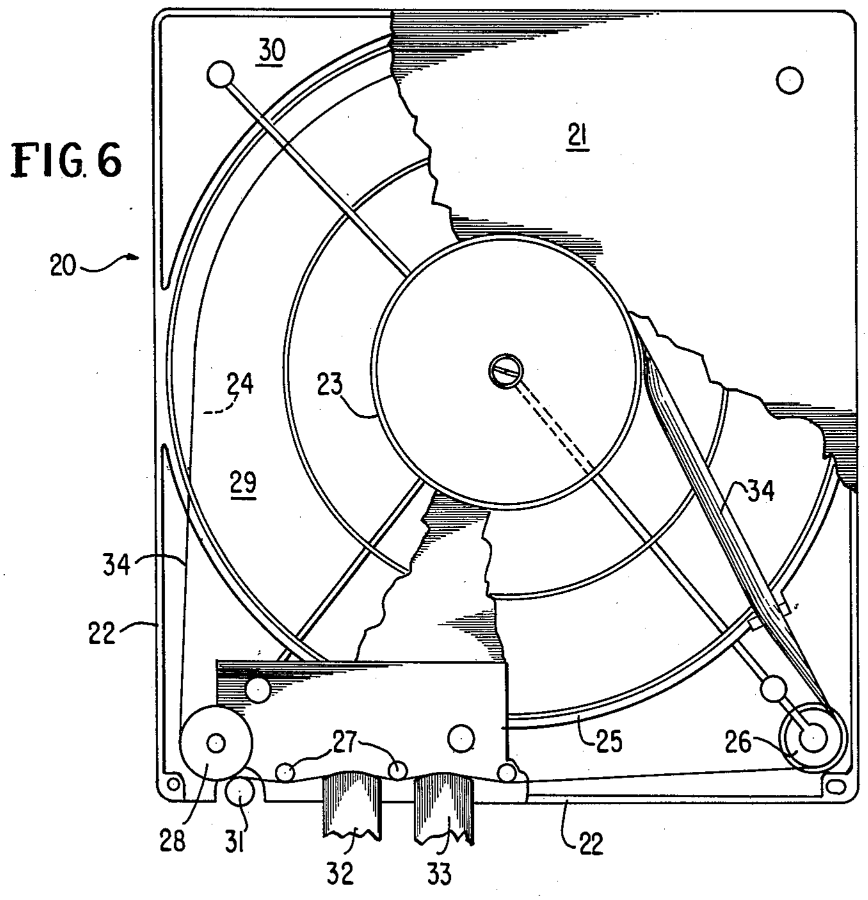
FIGURE 6 is a plan view of a single magazine assembly illustrating the tape in contact with the transducers and capstan.

The individual magazines (FIGURE 6) comprise a base portion 21, a discontinuous wall portion 22 extending upwardly from the base, a tapered rotatable hub 23, a generally flat rotatable tape support 24, a discontinuous raised curvate tape retainer 25, an idler 26, a series of tape guides 27, and a driven capstan 28. A rotatable circular disc 29 generally similar in configuration to the tape support 24 is mounted thereabove on the hub 23 and overlies the tape wound about the hub. A ribbed cover member 30 generally similar in configuration to the base portion 21 rests atop the wall portions 22 and serves as a top cover to the magazine assembly. When the capstan 28 is driven by a driving capstan 31 mounted near the rear wall 13 of the cartridge unit, tape is withdrawn from the interior of hub 23 over the disc 29, passed over the idler 26 along the guides 27 into engagement with the transducing heads 32 and 33, and thence passed between the driven and driving capstans 28 and 31, respectively, through a discontinuous portion of the tape retainer 25 onto the outer periphery of the tape roll. The magazine assembly shown is of the endless tape variety, although the next to be described inventive concept may also be utilized with other forms of magazine assemblies, reel assemblies, reel to reel assemblies, and the like.

Figure 7:
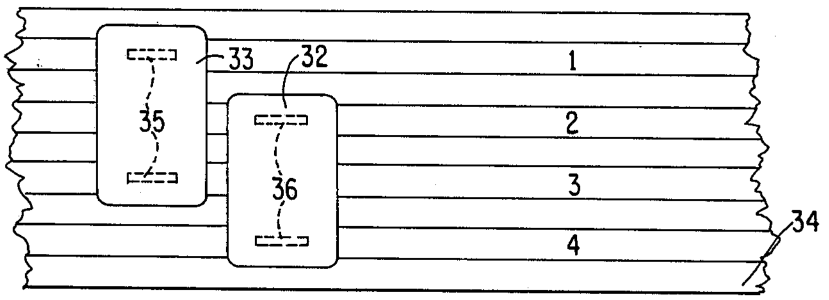
FIGURE 7 is an enlarged rear elevation of a pair of transducers in contact with a segment of tape.

In FIGURE 7, an enlarged section of tape 34 is shown in conjunction with transducing heads 32 and 33. The tape has four spaced apart playing tracks thereon, 1, 2, 3 and 4. The tape herein referred to describes a medium upon which intelligence of one form or another is impressed or to be impressed by magnetic or other means. Two transducers or pick-up heads are associated with each tape magazine as in FIGURES 2 and 6. It is to be understood that these heads in the case of a recording device constitute devices for impressing intelligence on the tape. Each of the transducers has two parallel spaced apart pick-up areas thereon (36 and 35 respectively). The transducers may be vertically offset from one another so that upper area 35 picks up track 1, upper area 36 picks up track 2, lower area 35 picks up track 3, and lower area 36 picks up track 4. Although at any given instant, all pick-up areas are in contact with the respective track, only one of the areas is active in the sense of the production of an audible signal.

The transducer head assembly 18, which is fixedly attached to the rear wall 13 of the tape cartridge unit, (FIGURES 2–5) comprises a rectilinear framework having opposed top and bottom portions 37 and opposed side portions 38 which are joined together. A series of pairs of vertically spaced threaded apertures 48 are formed on each of the members 38. Between apertures of each pair horizontally extending indentations 49 are formed on the rear side of the members 38 (FIGURE 4). Extending between adjacent horizontal indentations 49 are vertical indentations 52. The purpose of the horizontal and vertical indentations will be subsequently explained. A vertically extending central member 39 extends between the portions 37 intermediate the portions 38 and is either integral with or affixed to the members 37. Two spaced apart offset rows of elongate apertures 50 are formed on the member 39 for purposes which will subsequently be explained.

The individual transducer heads are partially imbedded in one end of a housing 40 which may be of plastic. The other end of the housing is provided with a circular aperture 41 which communicates with the rear of the partially imbedded head so that electrical connections may be inserted therethrough and connected to the head. A raised lip portion 42 surrounds the aperture entranceway. The head housing 40 has oppositely extending apertured, threaded ear portions 43 and 44 which are fixedly attached thereto or integral therewith.

The rear of the head housing 40 is positioned in flush engagement with a plate-like member 45 which has an aperture therein so that the raised lip 42 engages the area of the plate defining the aperture. On one side of the plate aperture is an upper inclined slot 46. On the other side of the plate aperture is a lower inclined slot 47. The center of slot 46 is on the periphery of an arc swung from the center of slot 47 and the center of slot 47 is on the periphery of an arc swung from the center of slot 46. The threaded aperture in the right ear portion 44 and the slot 46 are so positioned that a screw 51 may be passed therethrough to thereby fasten the head housing to the plate-like member 45. The aperture in the ear portion 43 of the head housing is in line with the slot 47 of the plate 45 and in addition in line with one of the slots 50 in member 39 and a second screw 51 is passed therethrough. It can thereby be seen that by tightening the screws 51 that the head housing is immobile with respect to the plate 45.

The plate-like member 45 has a horizontally extending, generally centrally located narrow slot 53 to one side of its enlarged lip receiving aperture. The left portion of this slot (FIGURE 4) normally lies directly above a portion of the horizontal indentation 49 on the members 38. The right portion of the slot overlies a horizontally extending indentation 54 on the back side of the ear portion 44 of the head housing 40. Above and below the narrow slot 53 on member 45 are positioned vertically elongate abutments 55 adapted to travel in the vertical indentation 52 in the member 38. Adjacent the abutments 55 and above and below the narrow slot 53 on the member 45 are positioned vertically aligned slots 56. Screws 57 may be passed through the slots 56 and screwed into the threaded apertures 48 in member 38. From the foregoing description, it should be clear that the screws 57 and the screw 51 through the member 39 attach the plate-like member to the lattice support while the screws 51 affix the head housing 40 to the plate-like member 45 with one of the screws 51 (the right one in FIGURE 4) performing both functions.

When the tape cartridge unit is completely assembled, the individual playback, or, for that matter, recording heads must be correctly positioned so that their pick-up portions 35 are in exact registry with the respective playing tracks. This registry involves two components; viz, alignment and azimuth. Alignment involves the vertical positioning of the head so that the pick-up portion is at the right height with respect to the track while azimuth involves rotating the head so that the pick-up portion is exactly at right angles or vertical to the track, i.e., every portion of the pick-up portion in contact with the track. Mis-alignment involves a loss of high and low frequency signal pick-up while errors in the azimuth adjustment involve a loss of high frequency signal pick-up. Due to the extremely small track and pick-up portion areas, the alignment-azimuth adjustment is very delicate. To accomplish the adjustment, a special register tape of known variety is inserted in the unit and driven over the heads like any other tape. The special tape may be so made up, for example, that a low frequency noise is audible or otherwise discernible when alignment between a given track and a given head is proper, while a high frequency noise is audible when the azimuth adjustment is exact. The tape could also be constructed in the opposite manner so that an audible or similar signal serves to indicate improper registry. In this case, the playback or similar portion of the head would be registered with the space between adjacent tape tracks. Since only one track is generally "played" at a time, the register tape must have at least four tracks thereon (one low and one high frequency track for each head).

It is not necessary in the case of a register tape to have a separate track for each of the pick-up portions on a head, since if the one pick-up portion on one head is properly registered with its track, the other pick-up portion on the same head is registered since both the pick-up portions on the head and the different tracks on the tape are related in a standard well-known manner among themselves.

To accomplish the alignment adjustment, the screws 57 and the screw 51 associated with the member 39 are loosened. A screw driver or similar implement is inserted through the left side of slot 53 (FIGURE 4) into the horizontal indentation 49 and by using the area defining the indentation 49 as a fulcrum, the plate 45 and head may be moved vertically. The screw driver or other implement utilized is in effect a lever of the second class. Movement is discontinued, of course, when the sound produced by the register tape ceases or begins depending upon the system utilized. Note that only vertical movement of the head takes place since the head is firmly affixed to the plate by the other screw 51 and since the abutments 55 on the plate 45 can only ride vertically in the vertical indentation 52 on member 38.

To accomplish the azimuth adjustment, the other screw 51 is loosened and a screw driver is inserted through the right side (FIGURE 4) of slot 53 into the horizontal indentation 54 on the head housing 40 and by using the area defining the slot 53 as a fulcrum, the head housing is rotated with respect to the plate 45. The screw driver or other implement utilized is in effect a lever of the first class. Movement is again discontinued when, for example, the sound produced by the register tape ceases. Note that when the head housing is rotated with respect to the plate that the axis of rotation is about an axis through the center of housing aperture 41 since the periphery of raised lip 42 travels around the area of the plate 45 defining the large lip accepting aperture. This is important in that it accomplishes true rotation of the transducer head about its central axis.

It can readily be seen that either the alignment or azimuth adjustment can be made, according to what screws are loosened and where the screw driver is inserted. In this manner, the previously tedious job of properly adjusting the playback heads is infinitely simplified and expedited. Furthermore, the degree of register obtained is quite high; a condition which continues to exist for relatively long periods of time under normal conditions. It should be especially noted that the technique and structure herein described is particularly adapted to production line operations since registry can be accomplished quickly and accurately by relatively unskilled workmen.

While a single embodiment of the invention has been shown and described, it will be obvious to those skilled in the art that various changes and modifications can be made therefrom without departing from the invention and, therefore, it is intended for the appended claims to cover all such changes and modifications as fall within the true spirit and scope of the invention.

I claim:

1. A transducer head assembly for a tape unit comprising a supporting structure, plate means removably and adjustably affixed to said supporting structure and vertically adjustable with respect thereto, first guide means for limiting movement of said plate means to vertical movement, a head housing affixed to said plate means and rotatable with respect thereto, second guide means for limiting movement of said plate means to rotative movement, and a transducer head affixed to said head housing and movable therewith.

2. A transducer head assembly for a tape unit comprising a supporting structure having at least two portions, one of said portions having apertures therein and the other of said portions having slots therein, plate means having a plurality of slots, certain of said slots adapted to be in line with said apertures on said supporting structure while another of said slots is adapted to be in line with one of said slots on said supporting structure, a head housing having apertured ear portions which are adapted to be in line, respectively, with the remaining slot in said plate and said other plate slot, a transducer head fixedly attached to said head housing, first fastening means extending through said in line slots and apertures, second fastening means extending through said in line slots and said apertured ear portion, third fastening means extending through said remaining plate slot and said apertured ear portion, whereby loosening of said first and second fastening means allows said head to be vertically adjusted with respect to said supporting structure and wherein loosening of said second and third fastening means allows said head to be rotated with respect to said plate and supporting means.

3. The assembly of claim 2 further characterized in that said plate means is provided with abutment means and said one of said supporting portions is provided with vertical indent means so as to permit only relative vertical movement between said plate means and said supporting structure.

4. The assembly of claim 2 further characterized in that said one of said supporting portions is provided with a horizontal indent, and said plate means is provided with an elongate horizontal slot which overlies said horizontal indent, and wherein vertical adjustment is accomplished through the use of an implement inserted through said elongate horizontal slot and extending into said horizontal indent and utilized as a lever of the second class.

5. The assembly of claim 2 further characterized in that one of said ear portions is provided with a horizontal indent, and said plate means is provided with an elongate horizontal slot which overlies said horizontal indent, and wherein rotative adjustment is accomplished through the use of an implement inserted through said elongate horizontal slot and extending into said horizontal indent and utilized as a lever of the first class.

6. The assembly of claim 2 further characterized in that said plate means has an enlarged central aperture, said head housing has an enlarged central aperture surrounded by a raised lip which is concentric to the transducer head and which is adapted to be inserted in said enlarged plate aperture so that rotation of said head housing accomplishes rotation of said transducer head about its axis.

References Cited in the file of this patent

FOREIGN PATENTS 1,042,255 Germany -------------- Oct. 30, 1958